US012769731B2

(12) United States Patent
Ye et al.

(10) Patent No.: US 12,769,731 B2
(45) Date of Patent: Oct. 20, 2026

(54) NATURAL LANGUAGE QUERY STATEMENT PROCESSING METHOD AND APPARATUS

(71) Applicant: Huawei Cloud Computing Technologies Co., Ltd., Guizhou (CN)

(72) Inventors: Zi Ye, Hangzhou (CN); Xinyu Duan, Hangzhou (CN); Zhefeng Wang, Hangzhou (CN); Baoxing Huai, Hangzhou (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 0 days.

(21) Appl. No.: 19/343,587

(22) Filed: Sep. 29, 2025

(65) Prior Publication Data

US 2026/0023742 A1 Jan. 22, 2026

Related U.S. Application Data

(63) Continuation of application No. PCT/CN2024/075706, filed on Feb. 4, 2024.

(30) Foreign Application Priority Data

Mar. 29, 2023 (CN) ........................ 202310323092.6

(51) Int. Cl.
*G06F 3/04842* (2022.01)
*G06F 16/2452* (2019.01)

(52) U.S. Cl.
CPC .... *G06F 16/24522* (2019.01); *G06F 3/04842* (2013.01)

(58) Field of Classification Search
CPC ........... G06F 16/24522; G06F 3/04842; G06F 3/0482; G06F 16/242; G06F 16/243; G06F 16/2455; G06F 16/248; G06F 16/2452; G06F 16/3329; G06F 16/24553
See application file for complete search history.

(56) References Cited

U.S. PATENT DOCUMENTS

| | | | | |
|---|---|---|---|---|
| 5,519,859 | A * | 5/1996 | Grace | G06F 16/2428 707/769 |
| 12,450,272 | B1 * | 10/2025 | Xu | G06F 16/2452 |
| 2003/0233347 | A1 * | 12/2003 | Weinberg | G06F 16/22 |
| 2024/0303235 | A1 * | 9/2024 | Kulkarni | G06F 16/24522 |
| 2025/0291772 | A1 * | 9/2025 | Hoang | G06F 40/40 |
| 2026/0080260 | A1 * | 3/2026 | Nguyen | G06N 3/096 |
| 2026/0133964 | A1 * | 5/2026 | El Bsat | G06F 16/24522 |
| 2026/0147744 | A1 * | 5/2026 | Kuznetsov | G06F 16/2282 |

FOREIGN PATENT DOCUMENTS

| | | |
|---|---|---|
| CN | 114547072 A | 5/2022 |
| WO | 2020023787 A1 | 1/2020 |

* cited by examiner

*Primary Examiner* — Jorge A Casanova
(74) *Attorney, Agent, or Firm* — Conley Rose, P.C.

(57) ABSTRACT

A natural language query statement processing method includes obtaining a natural language query statement; inputting the natural language query statement and the to-be-queried data table into a child table recall model to obtain at least one candidate data table; determining a target data table from the at least one candidate data table; and inputting the natural language query statement and the target data table into a natural language to structured query statement model to obtain a structured query statement.

20 Claims, 15 Drawing Sheets

Basic information table of companies in city A

| Company name | Year of establishment | Taxes in the last three years | Community | Enterprise registered address | Enterprise business address | ... | Introduction |
|---|---|---|---|---|---|---|---|
| ... | ... | ... | ... | ... | ... | ... | ... |
| ... | ... | ... | ... | ... | ... | ... | ... |
| ... | ... | ... | ... | ... | ... | ... | ... |
| ⋮ | ⋮ | ⋮ | ⋮ | ⋮ | ⋮ | ⋮ | ⋮ |
| ... | ... | ... | ... | ... | ... | ... | ... |

FIG. 5

Child table A

| Company name | Community | Enterprise registered address |
|---|---|---|
| ... | ... | ... |
| ... | ... | ... |
| ... | ... | ... |
| ⋮ | ⋮ | ⋮ |
| ... | ... | ... |

Child table B

| Company name | Taxes in the last three years |
|---|---|
| ... | ... |
| ... | ... |
| ... | ... |
| ⋮ | ⋮ |
| ... | ... |

FIG. 6

Child table 1

| Company name | Year of establishment | Enterprise registered address | Category name | Community |
|---|---|---|---|---|
| ... | ... | ... | ... | ... |
| ... | ... | ... | ... | ... |
| ⋮ | ⋮ | ⋮ | ⋮ | ⋮ |
| ... | ... | ... | ... | ... |

Child table 2

| Company name | Year of establishment | Enterprise registered address | Enterprise business address | Category name |
|---|---|---|---|---|
| ... | ... | ... | ... | ... |
| ... | ... | ... | ... | ... |
| ⋮ | ⋮ | ⋮ | ⋮ | ⋮ |
| ... | ... | ... | ... | ... |

Child table 3

| Company name | Year of establishment | Community | Sub-category name | Enterprise registered address |
|---|---|---|---|---|
| ... | ... | ... | ... | ... |
| ... | ... | ... | ... | ... |
| ⋮ | ⋮ | ⋮ | ⋮ | ⋮ |
| ... | ... | ... | ... | ... |

FIG. 7

Child table 1

| Company name | Year of establishment | Enterprise registered address | Category name | Community |
|---|---|---|---|---|
| ... | ... | ... | ... | ... |
| ... | ... | ... | ... | ... |
| ⋮ | ⋮ | ⋮ | ⋮ | ⋮ |
| ... | ... | ... | ... | ... |

Child table 2

| Name | Age | Gender | Company name | Contact number |
|---|---|---|---|---|
| ... | ... | ... | ... | ... |
| ... | ... | ... | ... | ... |
| ⋮ | ⋮ | ⋮ | ⋮ | ⋮ |
| ... | ... | ... | ... | ... |

Child table 3

| Company name | Year of establishment | Community | Sub-category name | Enterprise business address |
|---|---|---|---|---|
| ... | ... | ... | ... | ... |
| ... | ... | ... | ... | ... |
| ⋮ | ⋮ | ⋮ | ⋮ | ⋮ |
| ... | ... | ... | ... | ... |

FIG. 8

○ Child table 1: From--basic information table of companies in city XX

| Company name | Year of establishment | Enterprise registered address | Enterprise business address | Category name |
|---|---|---|---|---|
| XXX | XXXX | XXXX | XXX | XXX |

(√) Child table 2: From--basic information table of companies in city XX

| Company name | Year of establishment | Enterprise registered address | Category name | Community |
|---|---|---|---|---|
| XXX | XXXX | XXXX | XXX | XXXXXX |

○ Child table 3: From--basic information table of companies in city XX

| Company name | Year of establishment | Community | Sub-category name | Enterprise registered address |
|---|---|---|---|---|
| XXX | XXXX | XXXX | XXX | XXXXXX |

○ Child table 4: From--legal representative information table of companies in city XX

| Name | Age | Gender | Company name | Contact number |
|---|---|---|---|---|
| XXX | XX | X | XXX | XXXXXX |

OK

Create a child table

FIG. 9

○ Child table 1: From--basic information table of companies in city XX

| Company name | Year of establishment | Enterprise registered address | Enterprise business address | Category name |
|---|---|---|---|---|
| XXX | XXXX | XXXX | XXX | XXX |

(√) Child table 2: From--basic information table of companies in city XX

| Company name | Year of establishment | Enterprise registered address | Category name | Community |
|---|---|---|---|---|
| XXX | XXXX | XXXX | XXX | XXXXXX |

○ Child table 3: From--basic information table of companies in city XX

| Company name | Year of establishment | Community | Sub-category name | Enterprise registered address |
|---|---|---|---|---|
| XXX | XXXX | XXXX | XXX | XXXXXX |

(√) Child table 4: From--legal representative information table of companies in city XX

| Name | Age | Gender | Company name | Contact number |
|---|---|---|---|---|
| XXX | XX | X | XXX | XXXXXX |

OK

Create a child table

FIG. 10

Create a child table–from basic information table of companies in city XX

| Company name | Year of establishment | Taxes in the last three years | Community | Enterprise registered address | Enterprise business address | … | Introduction |
|---|---|---|---|---|---|---|---|
| XXX | XXX | XXX | XXX | XXX | XXX | … | XXX |

Generate

FIG. 12

NATURAL LANGUAGE QUERY STATEMENT PROCESSING METHOD AND APPARATUS

CROSS-REFERENCE TO RELATED APPLICATIONS

This is a continuation of International Patent Application No. PCT/CN2024/075706 filed on Feb. 4, 2024, which claims priority to Chinese Patent Application No. 202310323092.6 filed on Mar. 29, 2023, which are hereby incorporated by reference in their entireties.

TECHNICAL FIELD

Embodiments of this application relate to the field of artificial intelligence, and more specifically, to a natural language query statement processing method and apparatus.

BACKGROUND

With gradual informatization of various industries, practitioners have increasing requirements for data query and analysis. However, querying data from a database requires a structured query language (SQL) dedicated to the database, which imposes specific thresholds on users. A natural language to SQL (NL2SQL) technology is used to convert a natural language query statement entered by the user into an SQL statement, to lower a threshold for using the database.

However, there are a large quantity of data tables in the database, and each data table has a large quantity of fields and a large scale. Consequently, an NL2SQL process based on all to-be-queried data tables has a low speed and low accuracy, and final data query efficiency and accuracy are affected. Therefore, how to efficiently and accurately convert the natural language query statement into the SQL query statement becomes a technical problem that urgently needs to be resolved.

SUMMARY

Embodiments of this application provide a natural language query statement processing method and apparatus, to obtain, based on a natural language query statement, a child table with a smaller quantity of fields from a to-be-queried data table as an input of an NL2SQL model, so that a range of fields that need to be retrieved when the natural language query statement is converted into an SQL query statement is narrowed, efficiency and accuracy of converting the natural language query statement into the SQL query statement are improved, and efficiency and accuracy of querying for data based on a natural language are further improved.

According to a first aspect, a natural language query statement processing method is provided, including obtaining a natural language query statement, where the natural language query statement is used to query a to-be-queried data table for data, and the to-be-queried data table includes at least one parent table; inputting the natural language query statement and the to-be-queried data table into a child table recall model, to obtain at least one candidate data table, where the at least one candidate data table includes at least one child table of the at least one parent table; determining a target data table from the at least one candidate data table; and inputting the natural language query statement and the target data table into a natural language to structured query statement model, to obtain a structured query statement.

Based on the technical solution provided in this application, a child table with a smaller quantity of fields is obtained, based on the natural language query statement, from the to-be-queried data table as an input of an NL2SQL model, so that a range of fields that need to be retrieved when the natural language query statement is converted into the SQL query statement is narrowed, and efficiency and accuracy of converting the natural language query statement into the SQL query statement are improved.

With reference to the first aspect, in some implementations of the first aspect, determining the target data table from the at least one candidate data table includes generating a visual interface used to display representative information of the at least one candidate data table to a user, where the representative information of the at least one candidate data table includes any one or more of a name of a column of the at least one candidate data table, example data in the at least one candidate data table, a name of a parent table to which the at least one child table belongs, and a category of the parent table to which the at least one child table belongs; and receiving a selection operation, where the selection operation indicates the target data table selected by the user from the at least one candidate data table on the visual interface.

Based on the foregoing technical solution, the visual interface is used to interact with the user to display the candidate data table to the user and provide the user with a function of selecting the target data table from the candidate data table, so that the user can perceive a process of determining the target data table input into the NL2SQL model, and explainability of an NL2SQL result is improved. In addition, the user can further control and restrict a range of the target data table based on a query requirement of the user, to improve accuracy of converting the natural language query statement into the SQL query statement.

With reference to the first aspect, in some implementations of the first aspect, determining the target data table from the at least one candidate data table includes sorting the at least one candidate data table based on a correlation between the at least one candidate data table and the natural language query statement; and determining candidate data tables that rank top Q as the target data table, where Q is a positive integer greater than or equal to 1.

Based on the foregoing technical solution, the candidate data tables that rank top Q can be selected by default as the target data table based on rankings of correlations between the candidate data tables and the natural language query statement, so that accuracy of selecting the target data table from the candidate data tables is improved, and accuracy of converting the natural language query statement into the SQL query statement is further improved. In addition, when a plurality of candidate data tables with highest correlations are from a plurality of to-be-queried data tables, a plurality of candidate data tables from different to-be-queried data tables can be further selected by default as the target data table, so that multi-table joint NL2SQL for a multi-table joint query problem is implemented, and accuracy of converting the natural language query statement into the SQL query statement is further improved.

With reference to the first aspect, in some implementations of the first aspect, the method further includes training the child table recall model based on the to-be-queried data table, the natural language query statement, and the target data table, to update the child table recall model.

Based on the foregoing technical solution, when the user participates in a process of selecting the target data table from the candidate data table and corrects a default sorting result output by the child table recall model, the child table recall model can be further trained based on selection of the user for the candidate data table, to update the child table recall model. In this way, the candidate data table recalled by the child table recall model better meets a query requirement of the user.

With reference to the first aspect, in some implementations of the first aspect, the method further includes querying the to-be-queried data table by using the structured query statement to obtain a data query result.

Based on the foregoing technical solution, the SQL query statement with higher accuracy that is obtained based on the technical solutions of this application can be used to query the to-be-queried data table for data, so that efficiency and accuracy of querying for data are improved, and efficiency and accuracy of an entire process of querying for data based on a natural language are improved.

According to a second aspect, a natural language query statement processing apparatus is provided, including an obtaining module configured to obtain a natural language query statement, where the natural language query statement is used to query a to-be-queried data table for data, and the to-be-queried data table includes at least one parent table; a candidate data table generation module, configured to input the natural language query statement and the to-be-queried data table into a child table recall model, to obtain at least one candidate data table, where the at least one candidate data table includes at least one child table of the at least one parent table; a target data table determining module configured to determine a target data table from the at least one candidate data table; and a conversion module configured to input the natural language query statement and the target data table into a natural language to structured query statement model, to obtain a structured query statement.

With reference to the second aspect, in some implementations of the second aspect, the target data table determining module is further configured to generate a visual interface used to display representative information of the at least one candidate data table to a user, where the representative information of the at least one candidate data table includes any one or more of a name of a column of the at least one candidate data table, example data in the at least one candidate data table, a name of a parent table to which the at least one child table belongs, and a category of the parent table to which the at least one child table belongs; and receive a selection operation, where the selection operation indicates the target data table selected by the user from the at least one candidate data table on the visual interface.

With reference to the second aspect, in some implementations of the second aspect, the target data table determining module is further configured to sort the at least one candidate data table based on a correlation between the at least one candidate data table and the natural language query statement; and determine candidate data tables that rank top Q as the target data table, where Q is a positive integer greater than or equal to 1.

With reference to the second aspect, in some implementations of the second aspect, the apparatus further includes an update module configured to train the child table recall model based on the to-be-queried data table, the natural language query statement, and the target data table, to update the child table recall model.

With reference to the second aspect, in some implementations of the second aspect, the apparatus further includes a query module configured to query the to-be-queried data table by using the structured query statement, to obtain a data query result.

According to a third aspect, a computing device is provided, including a processor and a memory. The memory is configured to store instructions, and the processor is configured to invoke the instructions from the memory and run the instructions, so that the computing device performs the method according to any one of the first aspect or the possible implementations of the first aspect.

According to a fourth aspect, a computing device cluster is provided, including at least one computing device. Each computing device includes a processor and a memory. The memory is configured to store instructions, and the processor is configured to invoke the instructions from the memory and run the instructions, so that the computing device cluster performs the method according to any one of the first aspect or the possible implementations of the first aspect.

Optionally, the processor may be a general-purpose processor, and may be implemented by hardware or software. When the processor is implemented by using the hardware, the processor may be a logic circuit, an integrated circuit, or the like. When the processor is implemented by using the software, the processor may be a general-purpose processor, and is implemented by reading software code stored in the memory. The memory may be integrated into the processor, or may be located outside the processor and exist independently.

According to a fifth aspect, a chip is provided. The chip obtains instructions and executes the instructions to implement the method according to any one of the first aspect or the possible implementations of the first aspect.

Optionally, in an implementation, the chip includes a processor and a data interface. The processor reads, through the data interface, instructions stored in a memory, to implement the method according to any one of the first aspect or the possible implementations of the first aspect.

Optionally, in an implementation, the chip may further include a memory. The memory stores instructions, a processor is configured to execute the instructions stored in the memory. When the instructions are executed, the processor is configured to implement the method according to any one of the first aspect or the possible implementations of the first aspect.

According to a sixth aspect, a computer program product including instructions is provided. When the instructions are run by a computing device cluster, the computing device cluster is enabled to perform the method according to any one of the first aspect or the possible implementations of the first aspect.

According to a seventh aspect, a computer-readable storage medium is provided, including computer program instructions. When the computer instructions are executed by a computing device cluster, the computing device cluster is enabled to perform the method according to any one of the first aspect or the possible implementations of the first aspect.

For example, the computer-readable storage medium includes but is not limited to one or more of a read-only memory (ROM), a programmable ROM (PROM), an erasable PROM (EPROM), a flash memory, an electrically EPROM (EEPROM), and a hard drive.

Optionally, in an implementation, the foregoing storage medium may be further a non-volatile storage medium.

BRIEF DESCRIPTION OF DRAWINGS

FIG. 5 is a diagram of a parent table according to an embodiment of this application;

FIG. 6 is a diagram of a child table according to an embodiment of this application;

FIG. 7 is a diagram of a candidate data table according to an embodiment of this application;

FIG. 8 is a diagram of another candidate data table according to an embodiment of this application;

FIG. 9 is a diagram of a visual interface for displaying a candidate data table according to an embodiment of this application;

FIG. 10 is a diagram of another visual interface for displaying a candidate data table according to an embodiment of this application;

FIG. 12 is a diagram of a visual interface for creating a target data table according to an embodiment of this application;

DESCRIPTION OF EMBODIMENTS

Figure 1:
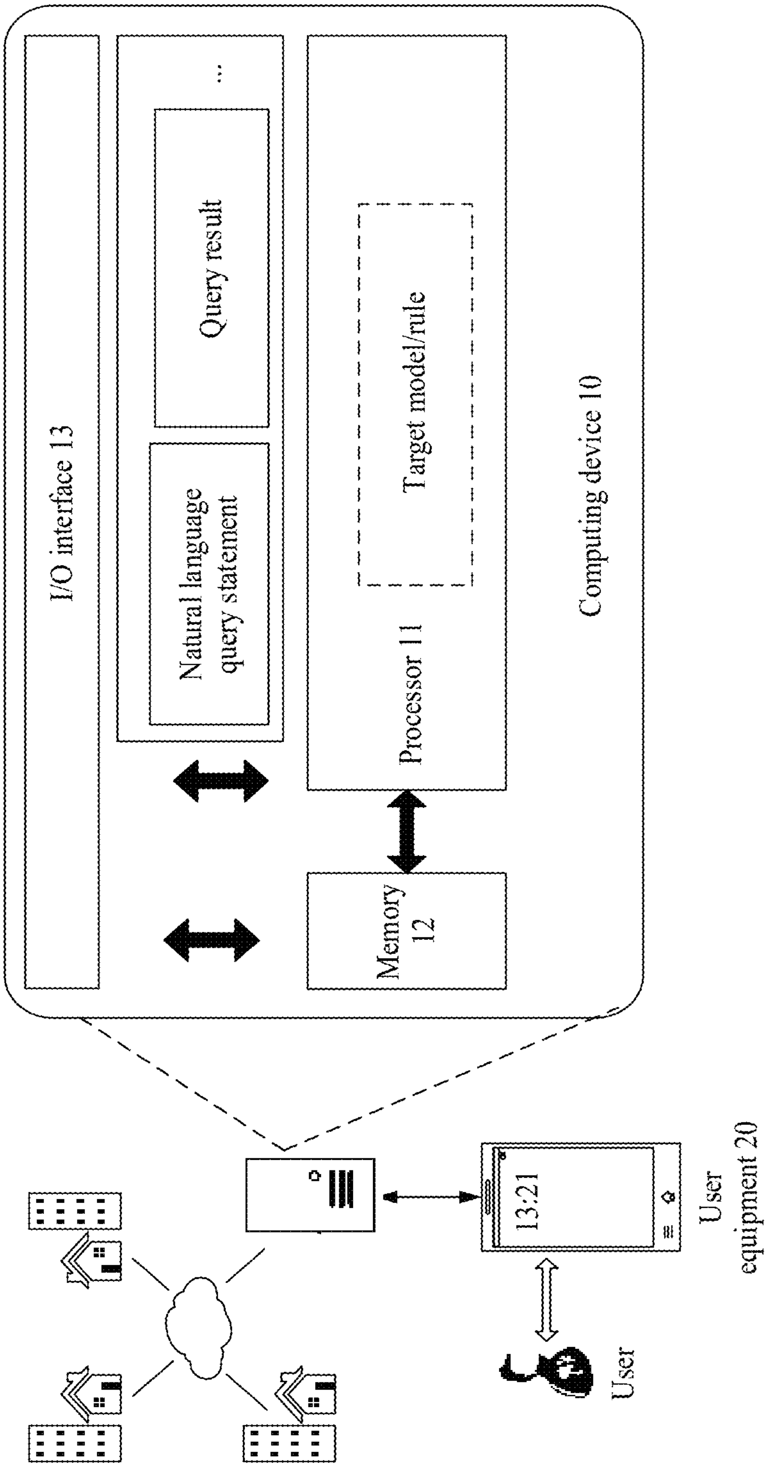
FIG. 1 is a diagram of a system for querying for table data based on a natural language according to an embodiment of this application.

The following describes technical solutions in embodiments in this application with reference to accompanying drawings.

Each aspect, embodiment, or feature is presented in this application with reference to a system including a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be further used.

In addition, in embodiments of this application, the terms such as "example" or "for example" are for indicating giving an example, an illustration, or a description. Any embodiment or design scheme described as an "example" in this application should not be explained as being more preferred or having more advantages than another embodiment or design scheme. Exactly, the term "example" is for presenting a concept in a specific manner.

In embodiments of this application, "relevant" and "corresponding" may sometimes be interchangeably used. It should be noted that meanings to be expressed by the terms are consistent when a difference between the terms is not emphasized.

A network architecture and a service scenario described in embodiments of this application are intended to describe the technical solutions in embodiments of this application more clearly, and do not constitute a limitation on the technical solutions provided in embodiments of this application. Persons of ordinary skill in the art may know that with evolution of the network architecture and emergence of a new service scenario, the technical solutions provided in embodiments of this application are also applicable to similar technical problems.

Reference to "an embodiment", "some embodiments", or the like described in this specification indicates that one or more embodiments of this application include a specific feature, structure, or characteristic described with reference to embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "have", and their variants all mean "include but are not limited to", unless otherwise specifically emphasized in another manner.

In this application, "at least one" means one or more, and "a plurality of" means two or more. The term "and/or" describes an association relationship for describing associated objects and represents that three relationships may exist. For example, A and/or B may represent the following cases: Only A exists, both A and B exist, and only B exists, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural.

For ease of understanding, terms and concepts related to embodiments of this application are first described below.

1. SQL: The SQL is a computer program language for operating a database, and is used to store, read, query for, and modify data in a relational database. A data table included in the database can be queried for data by using the SQL language to obtain required information.

2. NL2SQL: The NL2SQL is a technology for converting a natural language query statement into an SQL statement, so that a user can query for data without professional database knowledge. In this way, a threshold for using the database is lowered. Currently, the NL2SQL technology is mostly using a deep learning method to map a natural language to an SQL template in an end-to-end manner, and extract key information to form an SQL statement, so as to complete a database query task.

3. Table-based question answering: The table-based question answering is a task that provides an answer to a natural language question based on table content. The task may be described as follows. A table set T (including one or more tables) and a question Q in a form of natural language are input, and a correct answer A is output. A table form refers to a table form of the database. Currently, a table-based question answering task is generally completed by using the NL2SQL technology. To be specific, a natural language query statement entered by the user and a to-be-queried data table are input into a deep learning model, and the model converts the natural language into an SQL query statement, queries the to-be-queried table, and outputs a query result. The deep learning model for converting the natural language query statement into the SQL query statement in the foregoing table-based question answering process may be referred to as an NL2SQL model.

4. Child table: For the data table in the database, a column of the data table is referred to as a field, and one data table may be considered as one set of fields. In this case, all proper subsets of the field set are referred to as child tables of the data table, and the data table is referred to as a parent table to which these child tables belong. There is an owning correspondence relationship between the child table and the parent table. One parent table may have one or more child tables. For example, if a data table A includes M fields, a data table B including N fields selected from the M fields is referred to as a child table of the data table A, where M and N are positive integers greater than 1, and M is greater than N.

With gradual informatization of various industries, practitioners have increasing requirements for data query and analysis. However, to query the database for data, an SQL dedicated to the database needs to be used, and there is a specific threshold for the user. The NL2SQL is a technology developed to execute the table-based question answering task in the natural language, and is used to convert the natural language query statement entered by the user into the SQL query statement, to lower the threshold for using the database.

However, for the NL2SQL model, an entered to-be-queried data table usually has a large quantity of fields and a large scale, and the to-be-queried data table may include dozens or even hundreds of fields. As a result, an NL2SQL process has a low speed and low accuracy. If multi-table query needs to be performed, input data of the NL2SQL model may further include a plurality of to-be-queried data tables. Performing joint query on a plurality of large-scale data tables further leads to a low speed and low accuracy of the NL2SQL process, and further affects final data query efficiency and accuracy. Therefore, how to efficiently and accurately convert the natural language query statement into the SQL query statement becomes a technical problem that urgently needs to be resolved.

Actually, there are not many fields involved in a query by the user. For example, in "What is a profit of a product A in the first half of last year?", query content includes only fields such as time, product name, and profit. However, each to-be-queried data table may include hundreds of fields, and consequently, if all to-be-queried data tables are directly used as an input of the NL2SQL model, it takes a long time for the model to convert the natural language query statement into the SQL query statement based on all fields included in the model, and a large error may be generated.

In view of this, an embodiment of this application provides a natural language query statement processing method. Based on a natural language query statement entered by a user, a child table with a smaller quantity of fields is first obtained from a to-be-queried data table as a target data table, and then the target data table is used as an input of an NL2SQL model, so that a range of fields that need to be retrieved when the natural language query statement is converted into an SQL query statement is narrowed, efficiency and accuracy of converting the natural language query statement into the SQL query statement are improved, and efficiency and accuracy of querying for data based on a natural language are further improved.

Figure 2:
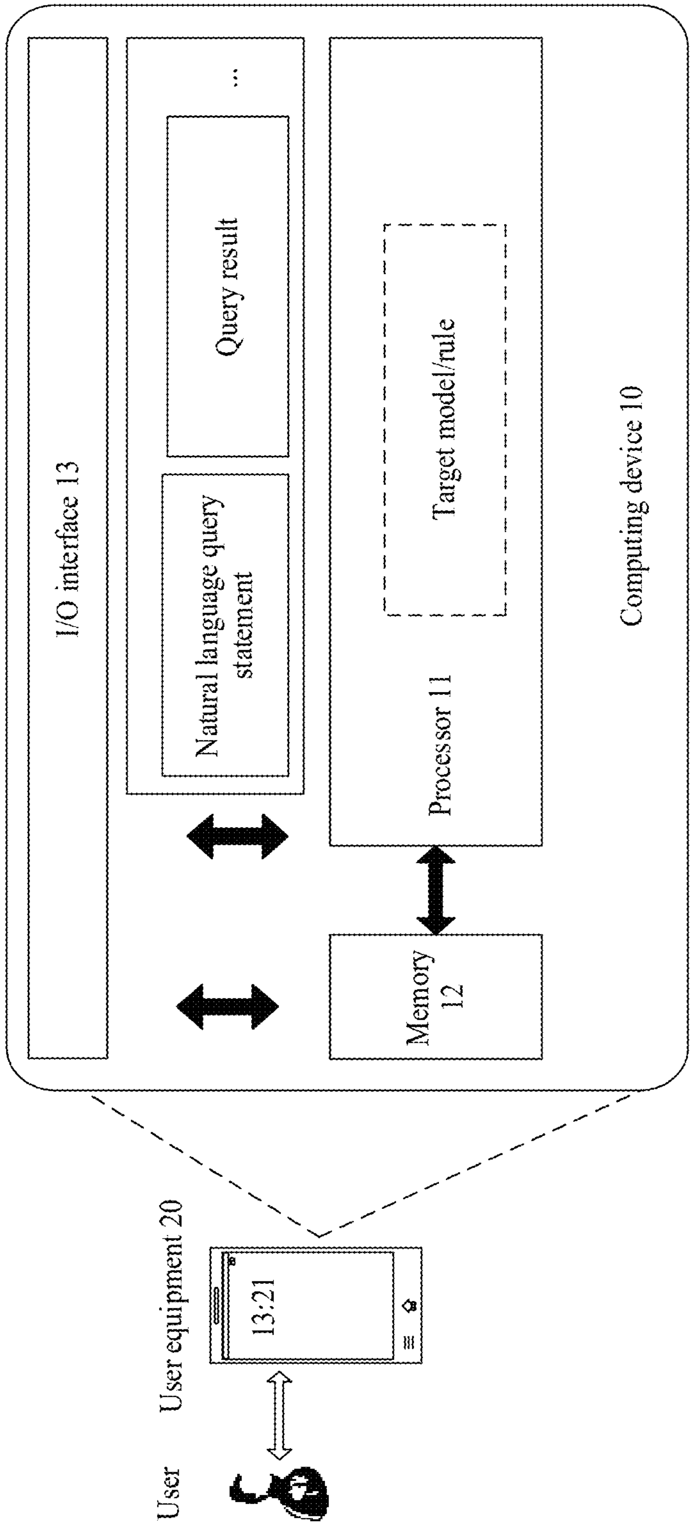
FIG. 2 is a diagram of another system for querying for table data based on a natural language according to an embodiment of this application.
Figure 3:
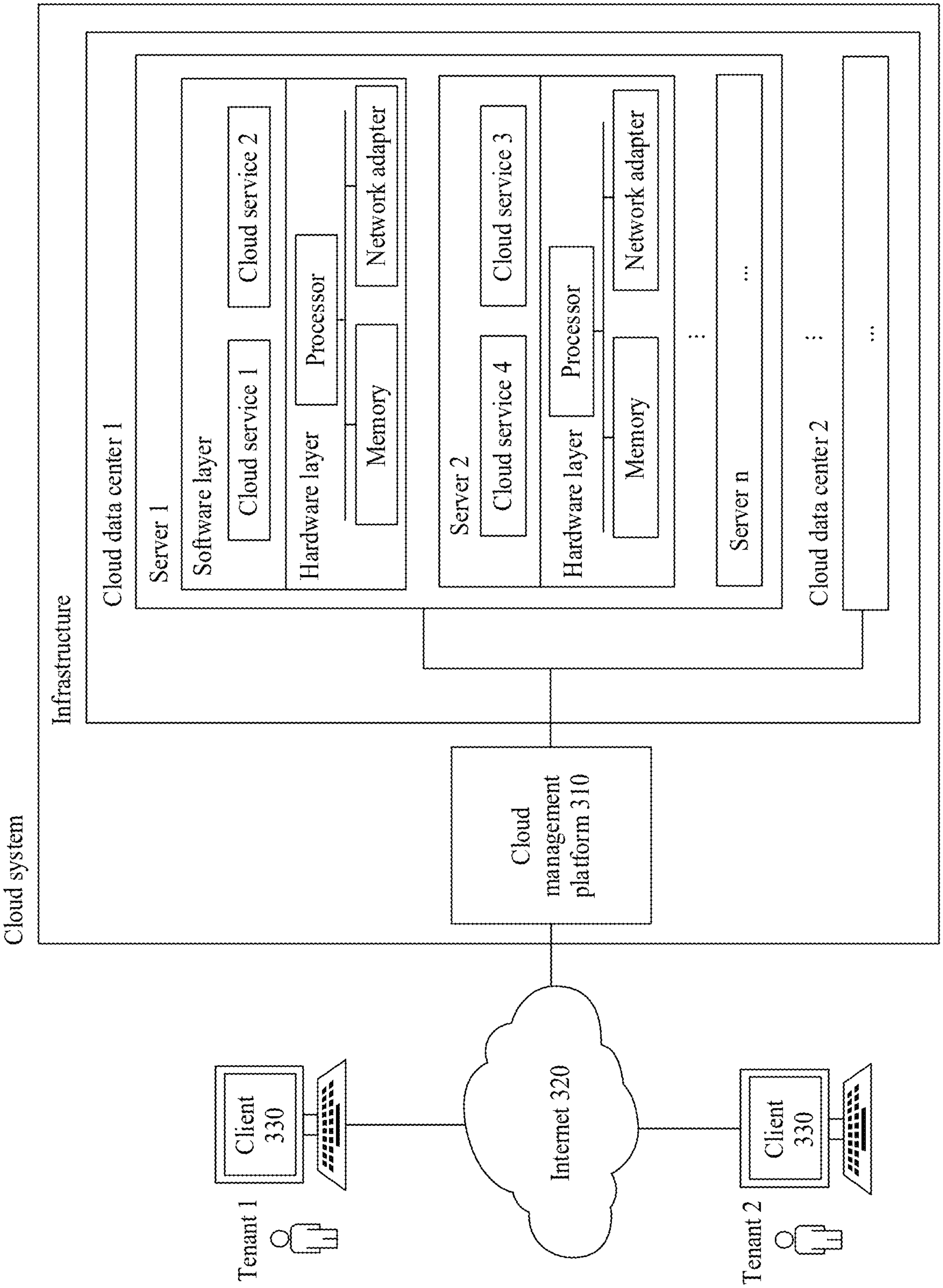
FIG. 3 is a diagram of a cloud system applied to the cloud field according to an embodiment of this application.

To better understand the solutions in embodiments of this application, the following briefly describes a possible application scenario in embodiments of this application with reference to FIG. 1 to FIG. 3.

FIG. 1 shows a system for querying for table data based on a natural language. The system includes user equipment 20 and a computing device 10. The user equipment 20 includes an intelligent terminal like a mobile phone, a personal computer, or an information processing center. The user equipment 20 is an initiator of data processing. A user may initiate a request through the user equipment 20, for example, a request for querying for table data based on a natural language question in this embodiment of this application.

The computing device 10 may be a device or a server that has a data processing function, like a cloud server, a network server, an application server, or a management server. The computing device 10 is configured with an input/output (I/O) interface 13 configured to exchange data with an external device. The user may enter data (for example, a natural language query statement in embodiments of this application) to the I/O interface 13 through the user equipment 20. The processor 11 may invoke data (for example, a to-be-queried data table), code, and the like in the memory 12 for corresponding processing (for example, obtaining a target model/rule through training, or performing inference by using the target model/rule, and in this embodiment of this application, the target model/rule may be, for example, a child table recall model or an NL2SQL model), and may further store data (for example, a candidate data table recalled based on the to-be-queried data table), an instruction, and the like that are obtained through corresponding processing in the memory 12. Finally, the I/O interface 13 returns a processing result, for example, the foregoing obtained processing result of the data, to the user equipment 20, to provide the processing result to the user. For example, in this embodiment of this application, a query result is provided to the user equipment 20.

It should be noted that the memory 12 in the computing device 10 may be a general term, and includes a local memory and a database that stores external data. The database may be on the computing device 10, or may be on another network server or server cluster.

In FIG. 1, the computing device 10 may perform the natural language query statement processing method in embodiments of this application.

FIG. 2 shows another system for querying for table data based on a natural language. In FIG. 2, the user equipment 20 is directly used as the computing device 10, and the user equipment 20 can directly receive an input from the user and directly process the input by hardware of the user equipment 20. A specific process is similar to that in FIG. 1. For details, refer to the foregoing descriptions. Details are not described herein again.

In FIG. 2, the user equipment 20 may perform the natural language query statement processing method in embodiments of this application.

Optionally, the natural language query statement processing method in embodiments of this application may also be applied to the field of cloud computing. FIG. 3 is a diagram of a cloud system applied to the cloud field according to an embodiment of this application.

As shown in FIG. 3, a cloud management platform 310 is configured to manage an infrastructure that provides a plurality of cloud services. The infrastructure includes a plurality of cloud data centers, each cloud data center includes a plurality of servers, and each server includes a cloud service resource to provide a corresponding cloud service for a tenant. The cloud service may include a cloud storage service, for example, a data warehouse, a data lake, or a data lakehouse, or may include a cloud service based on the foregoing cloud storage service, for example, a business intelligence (BI) system.

The cloud management platform 310 provides an access interface (for example, an interface or an application program interface (API)). The tenant can operate a client to remotely access the access interface to register a cloud account and a password on the cloud management platform and log in to the cloud management platform. After the cloud account and the password are successfully authenticated by the cloud management platform, the tenant can further pay to select and purchase a virtual machine of a specific specification (processor, memory, or disk) on the cloud management platform. After the purchasing with payment succeeds, the cloud management platform provides a remote login account and password of the purchased virtual machine, and the client can remotely log in to the virtual machine, and use a cloud service provided by a cloud service provider in the virtual machine.

Functions of the cloud management platform 310 include but are not limited to a user console, a computing management service, a network management service, a storage management service, an authentication service, and an image management service. The user console provides an interface or an API to interact with the tenant. The computing management service is used for managing a bare metal server and a server running a virtual machine and a container. The network management service is used for managing a network service (like a gateway and a firewall). The storage management service is used for managing a storage service (like a data bucket service). The authentication service is used for managing an account and a password of the tenant. The image management service is used for managing a virtual machine image.

The tenant may log in to the cloud management platform 310 by using a client 330 over the Internet 320, to obtain data (for example, a to-be-queried data table in embodiments of this application) stored in the cloud service. The cloud management platform 310 may provide, based on the to-be-queried data table, the user with a service of querying for table data based on a natural language.

In FIG. 3, the cloud management platform 310 may perform the natural language query statement processing method in embodiments of this application.

Figure 4:
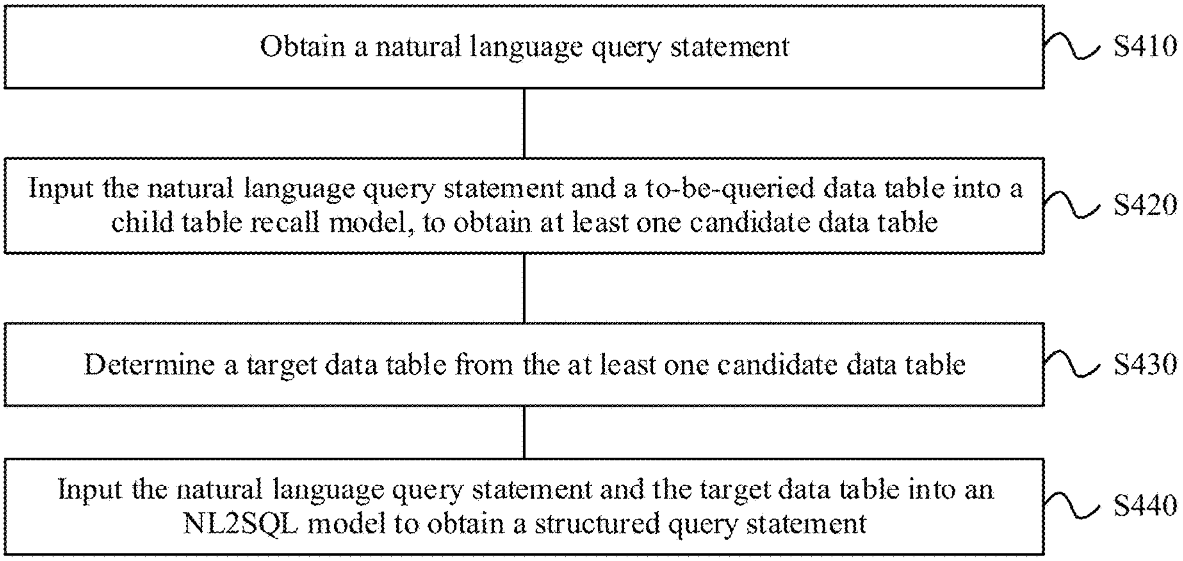
FIG. 4 is a flow block diagram of a natural language query statement processing method according to an embodiment of this application.

With reference to FIG. 4, the following describes the natural language query statement processing method in this application.

FIG. 4 is a schematic flowchart of a natural language query statement processing method according to an embodiment of this application. Optionally, the method in FIG. 4 may be performed by a processor, for example, the processor 11 in FIG. 1 and FIG. 2, may be performed by a device including a processor, for example, the computing device 10 in FIG. 1 and FIG. 2, or may be performed by a computing device cluster, for example, the cloud management platform 310 in FIG. 3. For brevity, the following describes some embodiments of this application by using an example in which the computing device 10 is used as an execution body. However, persons skilled in the art clearly know that this description does not constitute a limitation on the scope of this application.

As shown in FIG. 4, the method includes the following steps S410 to S440.

S410: Obtain a natural language query statement.

For example, in step S410, the computing device 10 may obtain a natural language query statement entered by a user. As an example rather than a limitation, the natural language query statement may be a query command, for example, "Query a profit of a product A in the first half of last year", or may be a natural language question, for example, "Which retail companies exist in the YY community of city XX after 2013?". Optionally, the natural language query statement entered by the user may be in a voice form, may be in a text form, or may be in any other natural language expression form. This is not specifically limited in this application.

Further, the natural language query statement is used to query a to-be-queried data table for data. The to-be-queried data table may include one or more parent tables. For example, FIG. 5 is a diagram of a parent table according to an embodiment of this application. As shown in FIG. 5, "Basic information table of companies in city A" is a name of the parent table. The parent table includes a plurality of fields. Each column of the table in the figure corresponds to one field, the first row of each column is referred to as a name of the column, for example, "Company name", "Year of establishment", and "Introduction", and other rows of each column are data corresponding to the column. It should be understood that FIG. 5 is merely an example of a diagram of a parent table. The to-be-queried data table may further include one or more other parent tables, for example, a "Basic information table of companies in city B", a "Legal representative information table of companies in city A", and a "Legal representative information table of companies in city B". Each parent table may include a same field or different fields.

Optionally, the to-be-queried data table may be entered by a user. For example, the computing device 10 may accept a data table uploaded by the user through the user equipment 20 as the to-be-queried data table.

Optionally, the to-be-queried data table may be obtained by the computing device 10 from a database. The database may be stored locally in the computing device, or stored in a network server, or may be stored in a server cluster that provides a cloud storage service. For example, the computing device 10 may access a BI system, and obtain a data table from a data storage cloud service (for example, a data lake) at a bottom layer of the BI system as the to-be-queried data table, to provide the BI system with an accurate and efficient service of querying for table data based on a natural language.

In some possible implementations, the computing device 10 may preprocess the obtained to-be-queried data table before a subsequent processing step. Preprocessing means include but are not limited to: processing structure information such as a type, a primary key, and a foreign key of a field of a data table; normalizing content of the data table, for example, unifying uppercase and lowercase, replacing a synonym, and converting a Chinese number; and organizing the content of the data table into a dictionary for backup. In this way, data in the data table can be normalized, and a convergence result can be more easily obtained when a neural network model performs inference or training by using the normalized data, thereby improving efficiency and accuracy of querying for data based on the natural language.

S420: Input the natural language query statement and the to-be-queried data table into a child table recall model, to obtain at least one candidate data table. The at least one candidate data table includes at least one child table of at least one parent table in the to-be-queried data table.

For example, in step S420, the computing device 10 may use the natural language query statement entered by the user and the to-be-queried data table obtained in S410 as inputs of the trained child table recall model, to obtain at least one candidate data table output by the child table recall model.

The at least one candidate data table includes at least one child table of at least one parent table in the to-be-queried data table. Further, a single candidate data table may be a parent table in the to-be-queried data table, or may be a child table including some fields selected from a parent table, and all candidate data tables include at least one of the foregoing child tables. It should be understood that the candidate data table and the to-be-queried data table are not limited to a one-to-one correspondence. For example, the candidate data table may include a plurality of different child tables of a first to-be-queried data table in to-be-queried data tables, but the candidate data table may not include a second to-be-queried data table in the to-be-queried data tables and any child table of the second to-be-queried data table.

For example, FIG. 6 is a diagram of a child table according to an embodiment of this application. As shown in FIG. 6, a child table A includes three fields whose column names are "Company name", "Community", and "Enterprise registered address", and a child table B includes two fields whose column names are "Company name" and "Taxes in the last three years". The foregoing fields are all included in the "Basic information table of companies in city A" in the example shown in FIG. 5. Therefore, both the child table A and the child table B are child tables of the parent table in the example shown in FIG. 5. When the "Basic information table of companies in city A" shown in FIG. 5 is one of to-be-queried data tables, both the child table A and the child table B may be used as one of candidate data tables.

Further, the child table recall model may recall the candidate data table based on a correlation between the to-be-queried data table and the natural language query statement. For example, the child table recall model may extract a name of a column in the entered to-be-queried data table, and provide, based on a character string comparison algorithm, a correlation score (a higher score indicates a higher correlation) of a name of each column relative to the natural language query statement, to further provide correlation scores of combinations of names of different columns relative to the natural language query statement, so that field combinations corresponding to first P combinations with highest correlation scores are output as P candidate data tables, where P is a positive integer greater than or equal to 1. The P candidate data tables include at least one child table of at least one parent table in the to-be-queried data table. In most cases, only some fields in all fields included in each parent table in the to-be-queried data table are related to the natural language query statement entered by the user. In this case, the P candidate data tables may be all child tables of the parent table in the to-be-queried data table. In some other cases, the natural language query statement entered by the user involves a large quantity of fields, and all fields in several parent tables in the to-be-queried data table are related to the natural language query statement entered by the user. In this case, the P candidate data tables may include several parent tables in the to-be-queried data table. It should be understood that the foregoing example is merely intended to describe a manner of generating the candidate data table through the child table recall model, and does not limit a specific algorithm of the child table recall model. The child table recall model may further determine the candidate data table based on another algorithm, for example, calculate an editing distance of a combination of names of different columns relative to the natural language query statement. This is not specifically limited in this application.

Optionally, when recalling the candidate data table, the child table recall model may sort the candidate data table based on a correlation between the candidate data table and the natural language query statement. For example, in the foregoing example, the P candidate data tables output by the child table recall model may be sorted based on correlation scores of corresponding P field combinations. For example, a field combination corresponding to a candidate data table ranked higher has a higher correlation score, and a candidate data table ranked first is a candidate data table corresponding to a combination with a highest correlation score in the foregoing P combinations. In the foregoing manner, candidate data tables output by the child table recall model can be sorted based on correlations with the natural language query statement, so that the computing device determines a default target data table from the candidate data tables based on the foregoing sorting. In addition, if the candidate data table is subsequently presented to the user, presented content can be clearer and more organized, so that the user can select the candidate data table.

S430: Determine a target data table from the at least one candidate data table.

For example, in step S430, the computing device 10 may determine one or more candidate data tables from the at least one candidate data table obtained in S420 as the target data table.

In some possible implementations, the computing device 10 may determine the target data table from the candidate data tables based on a default order. Further, candidate data tables that rank top Q are determined as the target data table, where Q is a positive integer greater than or equal to 1.

In some cases, a user query statement corresponds to a single-table query problem, and the P candidate data tables may be from a same parent table, for example, P different child tables of a same parent table. In this case, the computing device 10 may select, by default, a top-ranked candidate data table in the P candidate data tables as the target data table. For example, a natural language query statement S1 for the parent table "Basic information table of companies in city A" in the example shown in FIG. 5 is "Which retail companies exist in the YY community of city XX after 2013?". FIG. 7 shows three candidate data tables output by the child table recall model in this case and an arrangement order of correlations between the three candidate data tables and the natural language query statement S1. As shown in FIG. 7, a child table 1, a child table 2, and a child table 3 are all child tables of the parent table "Basic information table of companies in city A" in the example shown in FIG. 5. In addition, a correlation between the child table 1 and the natural language query statement S1 ranks first, a correlation between the child table 2 and the natural language query statement S1 ranks second, and a correlation between the child table 3 and the natural language query statement S1 ranks third. In this case, the computing device 10 selects the child table 1 as the target data table by default, to subsequently implement NL2SQL for a single-table query problem.

In some cases, a user query statement corresponds to a multi-table joint query problem, and the P candidate data tables may be from a plurality of parent tables. For example, candidate data tables that rank top Q in the P candidate data tables are respectively child tables of Q different parent tables. In this case, the computing device 10 may select the Q candidate data tables as the target data table by default. In this case, Q is a positive integer greater than 1 and less than P. For example, to-be-queried data tables include a "Legal representative information table of companies in city A" and a "Basic information table of companies in city A", and a natural language query statement S2 for the to-be-queried data table is "Query contact information of legal persons of software development companies in YY community of XX city". FIG. 8 shows three candidate data tables output by the child table recall model in this case and an arrangement order of correlations between the three candidate data tables and the natural language query statement S2. In FIG. 8, a correlation between a child table 1 and the natural language query statement S2 ranks first, a correlation between a child table 2 and the natural language query statement S2 ranks second, and a correlation between a child table 3 and the natural language query statement S2 ranks third. A software development type is a "Medium-type name" field. Names in columns of "Enterprise registered address" and "Community" involved in the query statement correspond to fields in the "Basic information table of companies in city A", and phone numbers of legal persons correspond to the "Legal representative information of companies in city A". Therefore, as shown in FIG. 8, the child tables 1 and 2 that rank top two in the three candidate data tables are respectively child tables of the "Basic information table of companies in city A" and the "Legal representative information table of companies in city A". In this case, the computing device 10 selects the child table 1 and the child table 2 as the target data table by default, to subsequently implement NL2SQL for a multi-table joint query problem.

In the foregoing manner, candidate data tables that rank top Q can be selected by default as the target data table based on rankings of correlations between the candidate data tables and the natural language query statement, so that accuracy of selecting the target data table from the candidate data tables is improved, and accuracy of converting the natural language query statement into an SQL query statement is further improved. In addition, when a plurality of candidate data tables with highest correlations are from a plurality of to-be-queried data tables, a plurality of candidate data tables from different to-be-queried data tables can be selected by default as the target data table, so that NL2SQL for a multi-table joint query problem is implemented, and accuracy of converting the natural language query statement into an SQL query statement in a multi-table joint query problem is further improved.

In some other possible implementations, the computing device 10 may further present the candidate data table to the user, to determine the target data table based on selection of the user. Further, the computing device 10 can generate a visual interface used to display representative information of the at least one candidate data table to the user, and receive a selection operation, where the selection operation indicates a target data table selected by the user from the at least one candidate data table on the visual interface. The representative information of the candidate data table may include but is not limited to any one or more of a name of a column of the candidate data table, example data in the candidate data table, a name of a parent table to which the candidate data table belongs, and a category of the parent table to which the candidate data table belongs. The following describes, with reference to FIG. 9 to FIG. 11, a visual interface provided in embodiments of this application by using examples.

FIG. 9 is a diagram of a visual interface for displaying a candidate data table according to an embodiment of this application. As shown in FIG. 9, the visual interface displays representative information of four candidate data tables to a user, including a name of a parent table to which the candidate data table belongs, a name of a column, and example data. The child table 1 in FIG. 9 is used as an example. "From-basic information table of companies in city XX" indicates that a name of a parent table to which a child table 1 belongs is a "Basic information table of companies in city XX". In the child table 1, for example, the first row is a name of a column, and the second row is one piece of data in each column, so that the user can clearly learn of fields included in the child table and a type of data stored in each field. Optionally, the visual interface may display representative information of candidate data tables based on a default order of the candidate data tables output by the child table recall model. The case shown in FIG. 9 is used as an example. The child table 1 to a child table 4 may be arranged in descending order of correlation scores output by the child table recall model. The child table 1 has a highest correlation score among the four candidate data tables, and the child table 4 has a lowest correlation score among the four candidate data tables, so that the user can more clearly learn of an output result of the child table recall model.

Based on the foregoing displayed representative information, the user can learn of information about each candidate data table, to select a candidate data table that meets a query requirement of the user as a target data table. Optionally, in the visual interface, a mark that can be selected may be provided for the user in front of each candidate data table. The user may select one or more candidate data tables in the visual interface, and tap an "OK" button, to complete selection of the target data table. For example, in a case shown in FIG. 9, if the user selects the child table 2, the computing device 10 can determine the child table 2 as the target data table. When candidate data tables displayed in the visual interface are from a plurality of parent tables, the user may further select a plurality of candidate data tables from different parent tables. For example, in a case shown in FIG. 10, the user selects both the child table 2 and the child table 4. In this case, the computing device 10 can determine the child table 2 and the child table 4 as the target data table.

Optionally, the representative information of the candidate data table displayed on the visual interface may further include a category of the parent table to which the candidate data table belongs. For example, when there is a large quantity of to-be-queried data tables, to help the user quickly find, in the visual interface, a required candidate data table from a plurality of candidate data tables based on a parent table to which the candidate data table belongs, a category of the parent table may be further displayed before a name of the parent table to which each candidate data table belongs in the visual interface.

Figure 11:
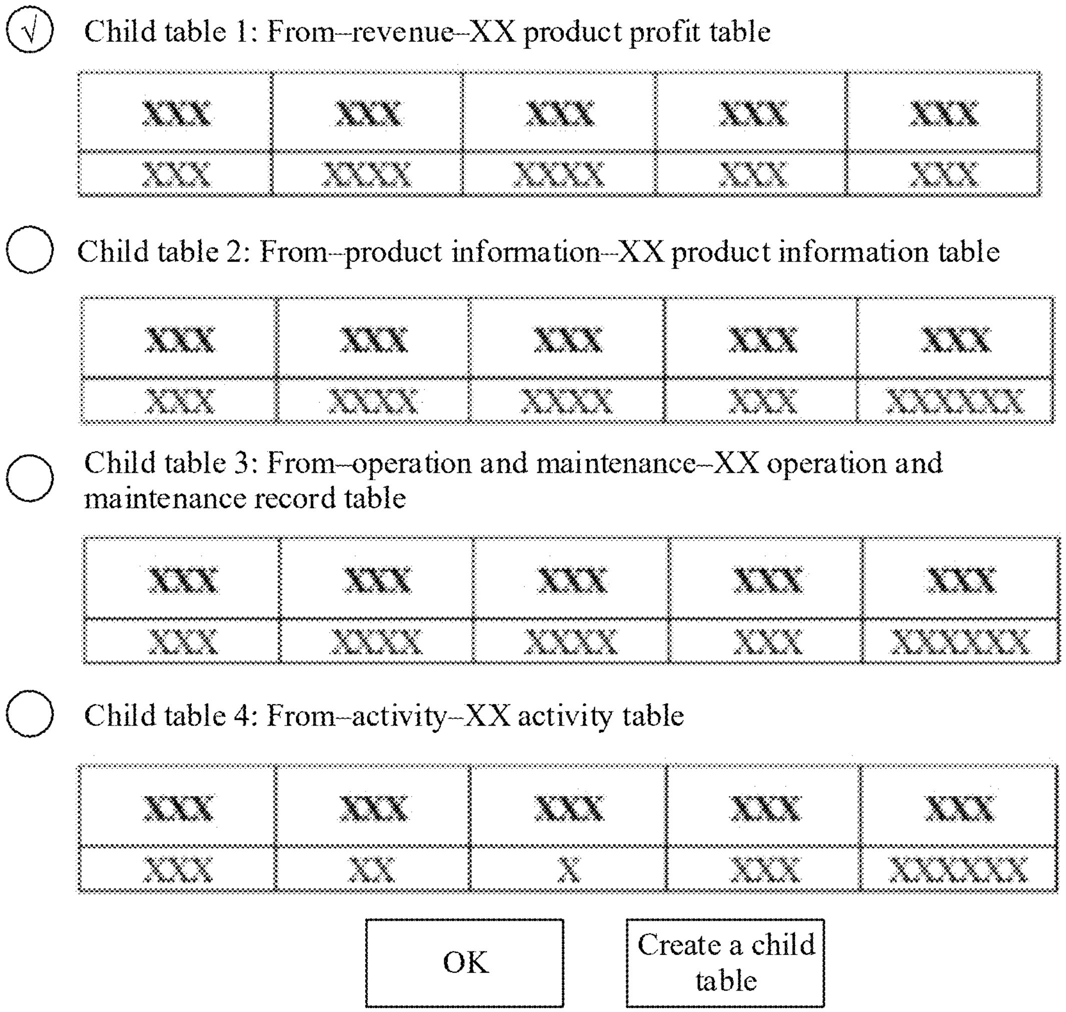
FIG. 11 is a diagram of another visual interface for displaying a candidate data table according to an embodiment of this application.

As an example rather than a limitation, when the natural language query statement processing method provided in embodiments of this application is applied to a BI system, the computing device 10 obtains a large quantity of to-be-queried data tables from a data lake of the BI system. When a user makes a query "What is a profit of a product A in the second half of last year?", the visual interface is shown in FIG. 11. Displayed four candidate data tables are from different parent tables, and each parent table belongs to a different category. For example, a child table 1 is a child table of a parent table 1 "XX product profit table", and the parent table 1 belongs to a "Revenue" category; a child table 2 is a child table of a parent table 2 "XX product information table", and the parent table 2 belongs to a "Product information" category; a child table 3 is a child table of a parent table 3 "XX operation and maintenance record table", and the parent table 3 belongs to an "Operation and maintenance" category; and a child table 4 is a child table of a parent table 4 "XX activity table", and the parent table 4 belongs to an "Activity" category. Because the user needs to query profit-related information, when selecting the target data table on the visual interface, the user may quickly find and select the corresponding child table 1 based on the "Revenue" category.

Optionally, the computing device 10 may further generate the target data table based on a creation operation of the user. For example, when there is no candidate data table that can meet a query requirement of the user in the candidate data tables displayed in the visual interface, the user may tap a "Create a child table" button shown in any visual interface in FIG. 9 to FIG. 11. In this case, the computing device may generate a visual interface used to create a new target data table.

FIG. 12 is a diagram of a visual interface for creating a target data table according to an embodiment of this application. As shown in FIG. 12, the visual interface may present, to a user, representative information of a parent table to which a child table in a candidate data table belongs. The user selects some fields in the parent table through a tap operation and taps a "Generate" button, so that the computing device 10 generates the target data table based on the fields selected by the user.

In the foregoing manner, the visual interface displays the candidate data table to the user, and provides the user with a function of selecting the target data table from the candidate data table, so that the user can perceive a process of determining the target data table input into an NL2SQL model, and explainability of an NL2SQL result is improved. In addition, the user can further control and restrict a range of the target data table based on a query requirement of the user, so that accuracy of converting a natural language query statement into an SQL query statement is improved.

Optionally, the computing device 10 may further update a child table recall model based on the target data table selected by the user. For example, when the target data table selected by the user through the visual interface is different from a target data table selected by the child table recall model by default, the computing device 10 may train the child table recall model based on a to-be-queried data table, a natural language query statement, and the target data table, to update the child table recall model.

Further, the computing device 10 may use a to-be-queried data table queried by the user this time and the entered natural language query statement as training data, and use the target data table selected by the user as a label of the training data, to obtain the labeled training data. The training data is used as an input of the child table recall model during training, and the label is used as an expected output of the child table recall model. Supervised training can be performed on the child table recall model based on the labeled training data, and a parameter of the child table recall model can be adjusted, so that an actual output of the child table recall model is closer to an expected output, thereby updating the child table recall model.

In the foregoing manner, when the user participates in a process of selecting the target data table from the candidate data table and corrects a default sorting result output by the child table recall model, the child table recall model can be further trained based on selection of the user for the candidate data table, to update the child table recall model. In this way, the candidate data table recalled by the child table recall model better meets a query requirement of the user.

S440: Input the natural language query statement and the target data table into the NL2SQL model, to obtain a structured query statement.

For example, in step S440, the computing device 10 may use the natural language query statement entered by the user and the target data table selected in S430 as inputs of the NL2SQL model, to obtain an SQL query statement output by the NL2SQL model. The NL2SQL model includes but is not limited to a multi-task question answering network (MQAN), SEQ2SQL, SqlNet, Sqlova, TypeSQL, X-SQL, Coarse2Fine, Pointer-SQL, Annotated Seq2Seq, and the like. The target data table is used to replace the to-be-queried data table as an input of the NL2SQL model, so that redundant fields with interference can be reduced, and a problem of excessively large input data of the NL2SQL model can be avoided.

According to the technical solution in this embodiment of this application, a child table with a smaller quantity of fields is obtained, based on the natural language query statement, from the to-be-queried data table as an input of the NL2SQL model, so that a range of fields that need to be retrieved when the natural language query statement is converted into the SQL query statement is narrowed, and efficiency and accuracy of converting the natural language query statement into the SQL query statement are improved.

Optionally, after obtaining the SQL query statement by using the foregoing method, the computing device 10 can query the to-be-queried data table by using the obtained SQL query statement, to obtain a data query result. The data query result may be data in the to-be-queried data table, or may be an answer statement generated based on the data in the to-be-queried data table. This is not specifically limited in this application.

In the foregoing manner, the SQL query statement with higher accuracy that is obtained based on technical solutions of this application can be used to query the to-be-queried data table for data, so that efficiency and accuracy of querying for data are improved, and efficiency and accuracy of an entire process of querying for data based on a natural language are improved.

Figure 13:
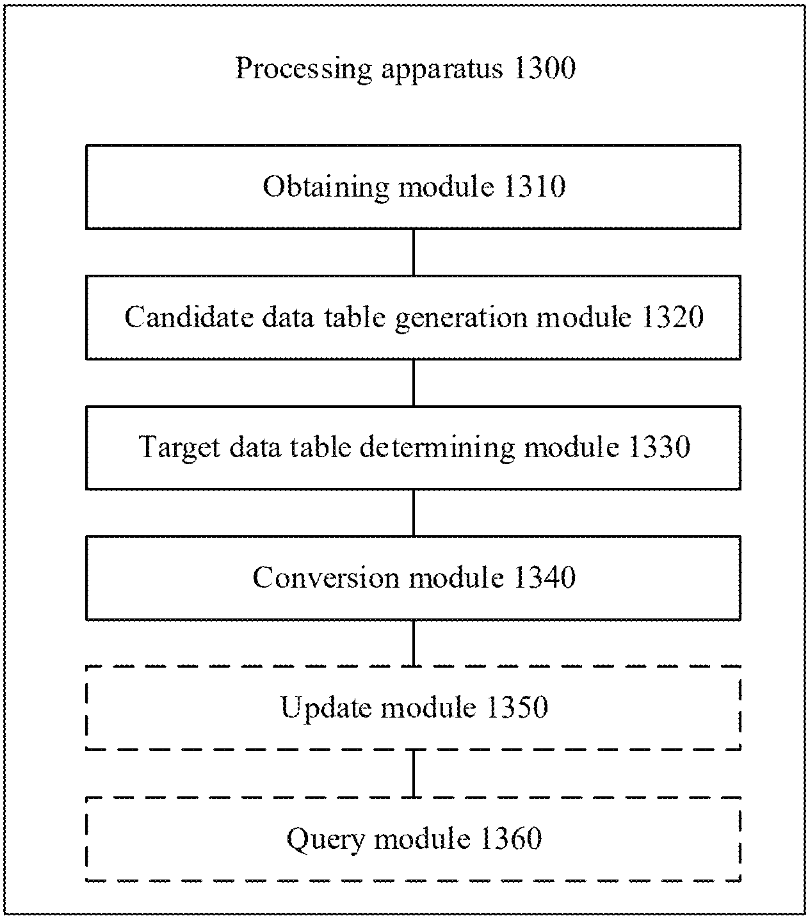
FIG. 13 is a block diagram of a natural language query statement processing apparatus according to an embodiment of this application.

FIG. 13 is a block diagram of a structure of a natural language query statement processing apparatus 1300 according to an embodiment of this application.

As shown in FIG. 13, the processing apparatus 1300 includes an obtaining module 1310, a candidate data table generation module 1320, a target data table determining module 1330, and a conversion module 130.

Further, the obtaining module 1310 is configured to obtain a natural language query statement, where the natural language query statement is used to query a to-be-queried data table for data, and the to-be-queried data table includes at least one parent table.

Further, the candidate data table generation module 1320 is configured to input the natural language query statement and the to-be-queried data table into a child table recall model, to obtain at least one candidate data table, where the at least one candidate data table includes at least one child table of the at least one parent table.

Further, the target data table determining module 1330 is configured to determine a target data table from the at least one candidate data table.

Optionally, the target data table determining module 1330 is further configured to generate a visual interface used to display representative information of the at least one candidate data table to a user, where the representative information of the at least one candidate data table includes any one or more of a name of a column of the at least one candidate data table, example data in the at least one candidate data table, a name of a parent table to which the at least one child table belongs, and a category of the parent table to which the at least one child table belongs; and receive a selection operation, where the selection operation indicates the target data table selected by the user from the at least one candidate data table on the visual interface.

Optionally, the target data table determining module 1330 is further configured to sort the at least one candidate data table based on a correlation between the at least one candidate data table and the natural language query statement; and determine candidate data tables that rank top Q as the target data table, where Q is a positive integer greater than or equal to 1.

Further, the conversion module 1340 is configured to input the natural language query statement and the target data table into a natural language to structured query statement model, to obtain a structured query statement.

Optionally, in some possible implementations, the processing apparatus 1300 further includes an update module 1350 configured to train the child table recall model based on the to-be-queried data table, the natural language query statement, and the target data table, to update the child table recall model.

Optionally, in some possible implementations, the processing apparatus 1300 further includes a query module 1360 configured to query the to-be-queried data table by using the structured query statement to obtain a data query result.

The foregoing modules may be implemented by using software, or may be implemented by using hardware. For example, the following uses the target data table determining module 1330 as an example to describe an implementation of the target data table determining module 1330. Similarly, for implementations of the obtaining module 1310, the candidate data table generation module 1320, the conversion module 1340, the update module 1350, and the query module 1360, refer to the implementation of the target data table determining module 1330.

In an example in which a module is a software functional unit, the target data table determining module 1330 may include code running on a compute instance. The computing instance may include at least one of a physical host (a computing device), a virtual machine, and a container. Further, there may be one or more computing instances. For example, the target data table determining module 1330 may include code running on a plurality of hosts/virtual machines/containers. It should be noted that the plurality of hosts/virtual machines/containers used to run the code may be distributed in a same region, or may be distributed in different regions. Further, the plurality of hosts/virtual machines/containers used to run the code may be distributed in a same availability zone (AZ), or may be distributed in different AZs. Each AZ includes one data center or a plurality of data centers that are geographically close to each other. Generally, one region may include a plurality of AZs.

Similarly, the plurality of hosts/virtual machines/containers used to run the code may be distributed in a same virtual private cloud (VPC), or may be distributed in a plurality of VPCs. Generally, one VPC is set in one region. A communication gateway needs to be set in each VPC for communication between two VPCs in a same region or between VPCs in different regions. Interconnection between VPCs is implemented through the communication gateway.

In an example in which a module is a hardware functional unit, the target data table determining module 1330 may include at least one computing device, for example, a server. Alternatively, the target data table determining module 1330 may be implemented by using an application-specific integrated circuit (ASIC), a device implemented by using a programmable logic device (PLD), or the like. The PLD may be implemented by a complex programmable logic device (CPLD), a field-programmable gate array (FPGA), generic array logic (GAL), or any combination thereof.

A plurality of computing devices included in the target data table determining module 1330 may be distributed in a same region, or may be distributed in different regions. A plurality of computing devices included in the target data table determining module 1330 may be distributed in a same AZ, or may be distributed in different AZs. Similarly, a plurality of computing devices included in the target data table determining module 1330 may be distributed in a same VPC, or may be distributed in a plurality of VPCs. The plurality of computing devices may be any combination of computing devices such as a server, an ASIC, a PLD, a CPLD, an FPGA, and GAL.

It should be noted that, in another embodiment, the obtaining module 1310, the candidate data table generation module 1320, the target data table determining module 1330, the conversion module 1340, the update module 1350, and the query module 1360 may be separately configured to perform any step in the foregoing natural language query statement processing method. Steps that the obtaining module 1310, the candidate data table generation module 1320, the target data table determining module 1330, the conversion module 1340, the update module 1350, and the query module 1360 are responsible for implementing may be specified as required. The obtaining module 1310, the candidate data table generation module 1320, the target data table determining module 1330, and the conversion module 1340, the update module 1350, and the query module 1360 separately implement different steps in the foregoing natural language query statement processing method, to implement all functions of the natural language query statement processing apparatus.

Figure 14:
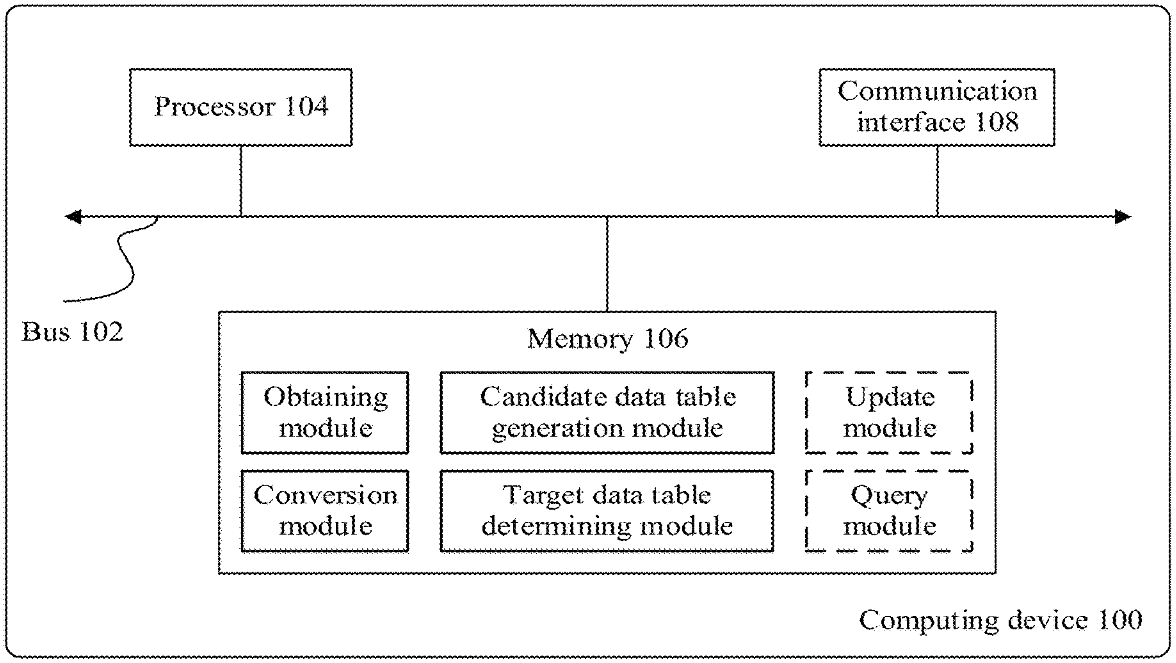
FIG. 14 is a block diagram of a structure of a computing device according to an embodiment of this application.

This application further provides a computing device 100. As shown in FIG. 14, the computing device 100 includes a bus 102, a processor 104, a memory 106, and a communication interface 108. The processor 104, the memory 106, and the communication interface 108 communicate with each other through the bus 102. The computing device 100 may be a server or a terminal device. It should be understood that quantities of processors and memories in the computing device 100 are not limited in this application.

The bus 102 may be a Peripheral Component Interconnect (PCI) bus, an Extended Industry Standard Architecture (EISA) bus, or the like. Buses may be classified into an address bus, a data bus, a control bus, and the like. For ease of representation, only one line is used for representation in FIG. 14, but this does not mean that there is only one bus or only one type of bus. The bus 102 may include a path for transmitting information between components (for example, the memory 106, the processor 104, and the communication interface 108) of the computing device 100.

The processor 104 may include any one or more of processors such as a central processing unit (CPU), a graphics processing unit (GPU), a microprocessor (MP), or a digital signal processor (DSP).

The memory 106 may include a volatile memory, for example, a random-access memory (RAM). The processor 104 may further include a non-volatile memory, for example, a ROM, a flash memory, a hard disk drive (HDD), or a solid-state drive (SSD).

The memory 106 stores executable program code, and the processor 104 executes the executable program code to separately implement functions of the obtaining module, the candidate data table generation module, the target data table determining module, the conversion module, the update module, and the query module, so as to implement the foregoing natural language query statement processing method. That is, the memory 106 stores an instruction used to perform the foregoing natural language query statement processing method.

The communication interface 108 implements communication between the computing device 100 and another device or a communication network through a transceiver module, for example, but not limited to a network interface card or a transceiver.

An embodiment of this application further provides a computing device cluster. The computing device cluster includes at least one computing device. The computing device may be a server, for example, a central server, an edge server, or a local server in a local data center. In some embodiments, the computing device may alternatively be a terminal device, for example, a desktop computer, a notebook computer, or a smartphone.

Figure 15:
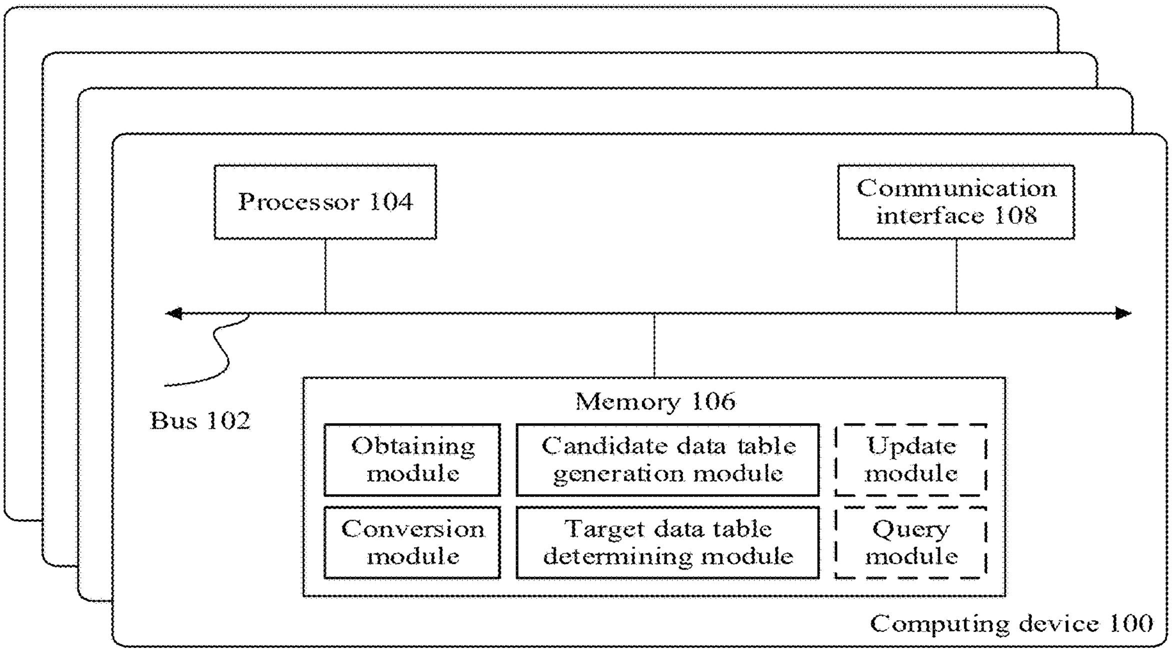
FIG. 15 is a block diagram of a structure of a computing device cluster according to an embodiment of this application.

As shown in FIG. 15, the computing device cluster includes at least one computing device 100. The memory 106 in each of the one or more computing devices 100 in the computing device cluster may store a same instruction used to perform the foregoing natural language query statement processing method.

In some possible implementations, the memory 106 of each of the one or more computing devices 100 in the computing device cluster may store some instructions used to perform the foregoing natural language query statement processing method. In other words, a combination of one or more computing devices 100 may jointly execute instructions used to perform the foregoing natural language query statement processing method.

It should be noted that memories 106 in different computing devices 100 in the computing device cluster may store different instructions, which are separately used to perform some functions of the foregoing natural language query statement processing apparatus. In other words, instructions stored in memories 106 in different computing devices 100 may implement functions of one or more of the obtaining module, the candidate data table generation module, the target data table determining module, the conversion module, the update module, and the query module.

Figure 16:
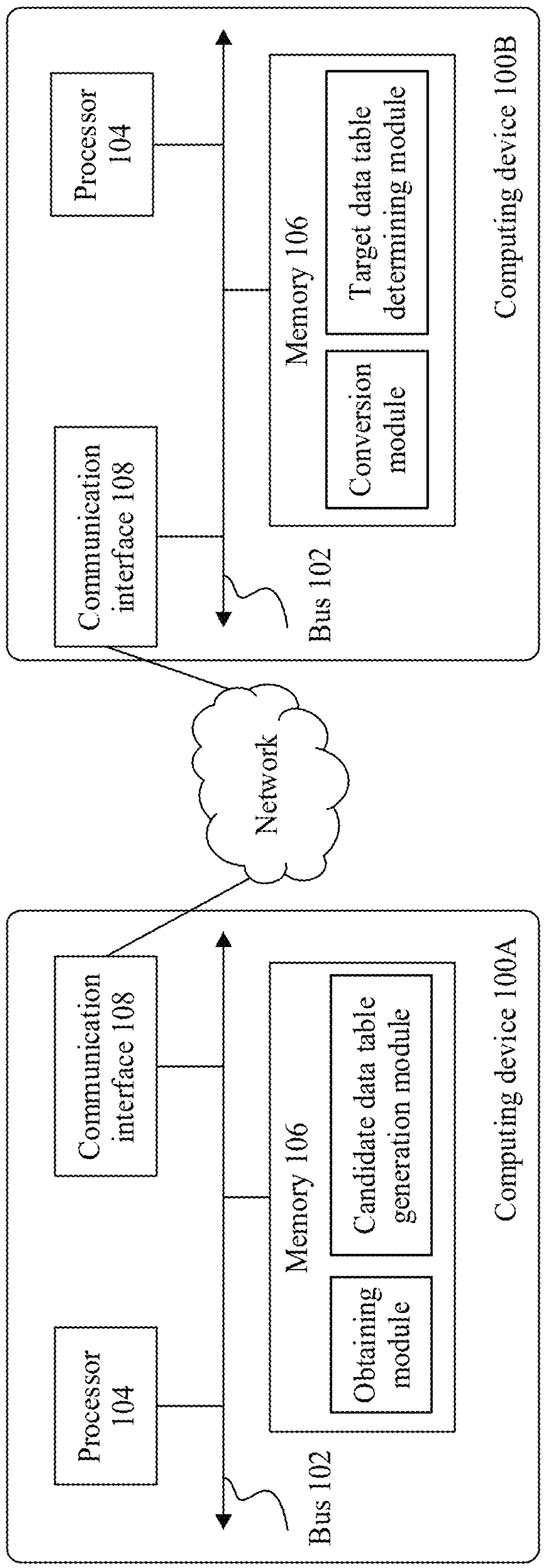
FIG. 16 is a block diagram of a structure of another computing device cluster according to an embodiment of this application.

In some possible implementations, the one or more computing devices in the computing device cluster may be connected through a network. The network may be a wide area network, a local area network, or the like. FIG. 16 shows a possible implementation. As shown in FIG. 16, two computing devices 100A and 100B are connected through a network. Further, each computing device is connected to the network through a communication interface in the computing device. In this possible implementation, the memory 106 in the computing device 100A stores instructions for performing functions of the obtaining module and the candidate data table generation module. In addition, the memory 106 in the computing device 100B stores instructions for functions of the target data table determining module and the conversion module.

It should be understood that functions of the computing device 100A shown in FIG. 16 may alternatively be completed by a plurality of computing devices 100. Similarly, functions of the computing device 100B may alternatively be completed by the plurality of computing devices 100.

An embodiment of this application further provides a chip. The chip includes a processor and a data interface. The processor reads, through the data interface, instructions stored in a memory, to perform the foregoing natural language query statement processing method.

An embodiment of this application further provides a computer program product including instructions. The computer program product may be software or a program product that includes the instructions and that can run on a computing device or be stored in any usable medium. When the computer program product runs on at least one computing device, the at least one computing device is enabled to perform the foregoing natural language query statement processing method.

Embodiments of this application further provide a computer-readable storage medium. The computer-readable storage medium may be any usable medium accessible by a computing device, or a data storage device, like a data center, including one or more usable media. The usable medium may be a magnetic medium (for example, a floppy disk, a hard disk, or a magnetic tape), an optical medium (for example, a DIGITAL VERSATILE DISC (DVD)), a semiconductor medium (for example, a solid-state drive), or the like. The computer-readable storage medium includes instructions, and the instructions instruct the computing device to perform the foregoing natural language query statement processing method.

The technical features in the foregoing embodiments may be combined in any manner. To make the description brief, all possible combinations of the technical features in the foregoing embodiments are not described. However, provided that the combinations of the technical features do not conflict with each other, it should be considered as the scope recorded in this specification.

The foregoing embodiments are merely intended to describe the technical solutions of this application, but not intended to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the protection scope of the technical solutions of embodiments of this application.

The invention claimed is:

1. A method comprising:

obtaining a natural language query statement to query a to-be-queried data table for data, wherein the to-be-queried data table comprises at least one parent table;

inputting the natural language query statement and the to-be-queried data table into a child table recall model to obtain at least one candidate data table, wherein the at least one candidate data table comprises at least one child table of the at least one parent table;

determining a target data table from the at least one candidate data table; and inputting the natural language query statement and the target data table into a natural language-to-structured query statement model to obtain a structured query statement.

2. The method of claim 1, wherein determining the target data table comprises:

generating a visual interface displaying representative information of the at least one candidate data table to a user, wherein the representative information a name of a column of the at least one candidate data table, example data in the at least one candidate data table, a name of a parent table to which the at least one child table belongs, or a category of the parent table to which the at least one child table belongs; and receiving, from the user, a selection operation selecting the target data table from the at least one candidate data table on the visual interface.

3. The method of claim 2, further comprising training the child table recall model based on the to-be-queried data table, the natural language query statement, and the target data table to update the child table recall model.

4. The method of claim 1, wherein determining the target data table comprises:

sorting the at least one candidate data table based on a correlation between the at least one candidate data table and the natural language query statement; and determining, as the target data table, candidate data tables having top Q ranking, wherein Q is a positive integer greater than or equal to 1.

5. The method of claim 1, further comprising querying the to-be-queried data table using the structured query statement to obtain a data query result.

6. An apparatus comprising:

one or more memories configured to store instructions; and one or more processors coupled to the one or more memories, wherein when executed by the one or more processors, the instructions cause the apparatus to:

obtain a natural language query statement to query a to-be-queried data table for data, wherein the to-be-queried data table comprises at least one parent table;

input the natural language query statement and the to-be-queried data table into a child table recall model to obtain at least one candidate data table, wherein the at least one candidate data table comprises at least one child table of the at least one parent table;

determine a target data table from the at least one candidate data table; and input the natural language query statement and the target data table into a natural language-to-structured query statement model to obtain a structured query statement.

7. The apparatus of claim 6, wherein to determine the target data table, when executed by the one or more processors, the instructions further cause the apparatus to:

generate a visual interface displaying representative information of the at least one candidate data table to a user, wherein the representative information of the at least one candidate data table comprises a name of a column of the at least one candidate data table, example data in the at least one candidate data table, a name of a parent table to which the at least one child table belongs, or a category of the parent table to which the at least one child table belongs; and receive, from the user, a selection operation selecting the target data table from the at least one candidate data table on the visual interface.

8. The apparatus of claim 7, wherein when executed by the one or more processors, the instructions further cause the apparatus to train the child table recall model based on the to-be-queried data table, the natural language query statement, and the target data table to update the child table recall model.

9. The apparatus of claim 6, wherein to determine the target data table, when executed by the one or more processors, the instructions further cause the apparatus to:

sort the at least one candidate data table based on a correlation between the at least one candidate data table and the natural language query statement; and determine, as the target data table, candidate data tables having top Q ranking, wherein Q is a positive integer greater than or equal to 1.

10. The apparatus of claim 6, wherein when executed by the one or more processors, the instructions further cause the apparatus to query the to-be-queried data table using the structured query statement to obtain a data query result.

11. A computer program product comprising computer-executable instructions that are stored on a non-transitory computer-readable storage medium and that, when executed by one or more processors, cause an apparatus to:

obtain a natural language query statement to query a to-be-queried data table for data, wherein the to-be-queried data table comprises at least one parent table;

input the natural language query statement and the to-be-queried data table into a child table recall model to obtain at least one candidate data table, wherein the at least one candidate data table comprises at least one child table of the at least one parent table;

determine a target data table from the at least one candidate data table; and input the natural language query statement and the target data table into a natural language-to-structured query statement model to obtain a structured query statement.

12. The computer program product of claim 11, wherein to determine the target data table, when executed by the one or more processors, the instructions further cause the apparatus to:

generate a visual interface displaying representative information of the at least one candidate data table to a user; and receive, from the user, a selection operation indicating the target data table from the at least one candidate data table on the visual interface.

13. The computer program product of claim 12, wherein the representative information comprises a category of a parent table to which the at least one child table belongs.

14. The computer program product of claim 12, wherein the representative information comprises a name of a column of the at least one candidate data table.

15. The computer program product of claim 12, wherein the representative information comprises example data in the at least one candidate data table.

16. The computer program product of claim 12, wherein the representative information comprises a name of a parent table to which the at least one child table belongs.

17. The computer program product of claim 11, wherein to determine the target data table, when executed by the one or more processors, the instructions further cause the apparatus to:

sort the at least one candidate data table based on a correlation between the at least one candidate data table and the natural language query statement; and determine, as the target data table, candidate data tables having top Q ranking, wherein Q is a positive integer greater than or equal to 1.

18. The computer program product of claim 11, wherein when executed by the one or more processors, the instructions further cause the apparatus to train the child table recall model based on the to-be-queried data table, the natural language query statement, and the target data table to update the child table recall model.

19. The computer program product of claim 11, wherein when executed by the one or more processors, the instructions further cause the apparatus to query the to-be-queried data table using the structured query statement to obtain a data query result.

20. The computer program product of claim 19, wherein the data query result comprises the data in the to-be-queried data table.

* * * * *